March 22, 1966 F. KULICK 3,241,430
THREE AXIS OPTICAL ALIGNMENT DEVICE
Filed Sept. 24, 1962 4 Sheets-Sheet 1

INVENTOR.
FREDERICK KULICK
BY Roger W. Jensen
ATTORNEY

March 22, 1966 F. KULICK 3,241,430
THREE AXIS OPTICAL ALIGNMENT DEVICE
Filed Sept. 24, 1962 4 Sheets-Sheet 2

INVENTOR.
FREDERICK KULICK
BY Roger W. Jensen
ATTORNEY

March 22, 1966    F. KULICK    3,241,430
THREE AXIS OPTICAL ALIGNMENT DEVICE
Filed Sept. 24, 1962    4 Sheets-Sheet 3

*INVENTOR.*
FREDERICK KULICK
BY Roger W. Jensen
ATTORNEY

INVENTOR.
FREDERICK KULICK

United States Patent Office 3,241,430
Patented Mar. 22, 1966

3,241,430
THREE AXIS OPTICAL ALIGNMENT DEVICE
Frederick Kulick, Clearwater, Fla., assignor to
Honeywell Inc., a corporation of Delaware
Filed Sept. 24, 1962, Ser. No. 225,458
1 Claim. (Cl. 88—14)

This invention pertains to a three-axis alignment system and more particularly to apparatus for optically aligning inertial guidance systems or the like in three axes simultaneously.

As is well known in the art, once an inertial system or the like is energized it maintains the original alignment regardless of its physical position in space. In order to give this information some value, the original alignment must be known precisely. A set of coordinate axes, for example, north, east and vertical, generally are chosen and the inertial system is aligned to this chosen set of axes. Thus, any measurements made in the inertial guidance system will be made in relation to this set of coordinate axes and will have a unique value in space or on earth.

In prior art systems for aligning inertial guidance systems, some device such as an autocollimator is utilized to align one or two axes at a time. Thus, the alignment is accomplished in several long and tedious steps. The prior art methods are especially difficult because adjusting the inertial guidance system about one axis generally misaligns it about one of the other axes. Thus, the various alignment steps must be repeated several times.

The present idea is a system for aligning all three axes of an inertial guidance system in a single operation. The preferred embodiment of this idea consists of a reflecting means, which in this case is a reflecting pyramid, mounted on an inertial guidance system, or similar device to be aligned, with its base discernible from a remote position. A three axis autocollimator comprised of light separating means which in this embodiment is a multiple reflector, four or more light sources, a light detector and electronic circuitry is positioned remotely to the inertial guidance system where the base of the pyramid is viewable.

The electronic circuitry is utilized to energize the four light sources. The light sources are energized by pulses so that only preselected light sources are energized at any given instant and, in essence, the light from each source or from sets of sources is unique because of this time-sharing. The multiple-reflector in this preferred embodiment is formed by the intersection of two right angle prisms normal to each other to form a cross. The inclined surfaces are metallized to reflect light. The apexes of the prisms are flattened and clear to form a cross-shaped slit or optically transparent means. The metallized inclined surfaces are rigidly mounted facing an objective lens with the cross-shaped slit in the focal plane of the objective lens. The light detector is mounted in optical alignment with the objective lens and the multiple reflector is mounted therebetween. The light sources are mounted so that a beam of light is transmitted from each source to one of the inclined surfaces of the multiple reflector. The inclined surfaces of the multiple reflector, which serve as a plurality of light emitting means, reflect the beams through the objective lens to the reflecting pyramid parallel to an axis through the centers of the multiple reflector and the reflecting pyramid. The reflecting pyramid reflects each beam back through the objective lens to the multiple reflector. If the pyramid and the multiple reflector are aligned in all three axes, each returning beam of light strikes the inclined surface of the multiple reflector which is opposite the inclined surface from whence it was originally reflected since the reflected image of the inclined surfaces will be superimposed upon the inclined surfaces. If the pyramid and the multiple reflector are not aligned in one or more of the three axes, some of the light will fall upon the cross-shaped slit and be transmitted through the multiple reflector to the light detector. The output of the light detector is connected to the electronic circuitry, which, because of the pulsing of the plurality of light sources, can determine from which light source the light came. By knowing from which source the light entering the light detector came, the electronic circuitry can determine about which axis or axes the pyramid, and therefore the inertial guidance system, is misaligned. Also, the amount of light entering the light detector will indicate the amount of misalignment.

Thus, a compact three-axis alignment system for aligning inertial guidance systems or the like about three axes simultaneously is disclosed.

It is a primary object of this invention to provide an improved control apparatus.

It is a further object of this invention to provide a three-axis optical alignment system.

It is a further object of this invention to provide a system for aligning inertial guidance systems and the like about three axes simultaneously.

These and other objects of this invention will become apparent from the following description of a preferred form thereof, and the accompanying specification, claims and drawings of which:

Figure 1:
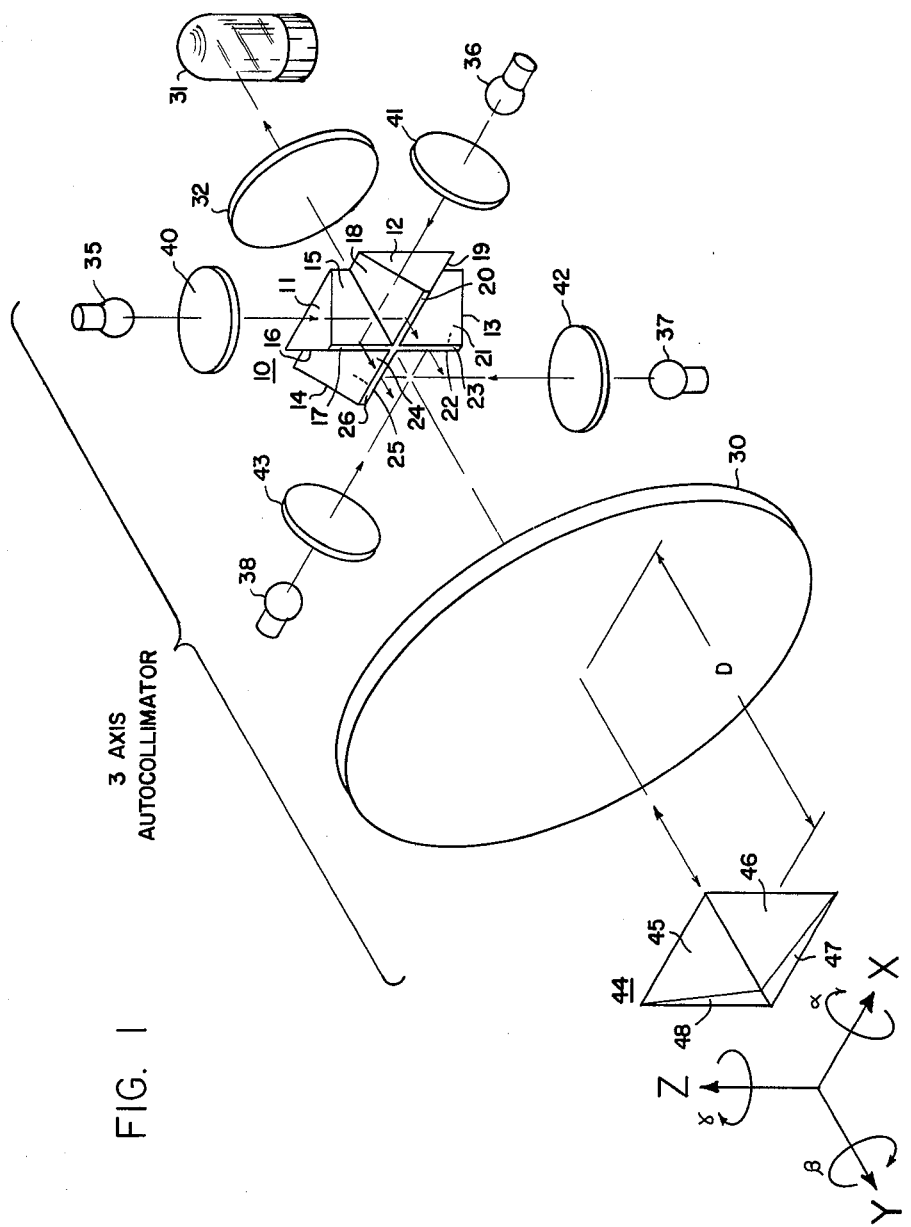
FIGURE 1 is a schematic diagram of the optical system.

FIGURE 1 is a schematic diagram of the optical system of the three-axis electro-optical alignment system. The optical system is in two parts: the three-axis autocollimator and a reflecting means, which in this preferred embodiment is a reflecting pyramid 44. Reflecting pyramid 44 is rigidly mounted on the device to be aligned in three axes, which may be an inertial platform or other guidance system, with the base facing the three-axis autocollimator. The pyramid 44 and three-axis autocollimator, in practice, will be separated by some distance D, ranging from a few inches to several hundred feet, depending upon the application.

In FIGURE 1 the numeral 10 designates a multiple reflector which may be formed by a plurality of reflecting surfaces rigidly attached in a fixed relationship to each other and having openings for light to pass therebetween. In this preferred embodiment the multiple reflector 10 is formed by the intersection of two right angle prisms normal to each other to form a cross having four equal length arms 11, 12, 13 and 14. Multiple reflector 10 is mounted, by means not shown, so that arms 11 and 13 are vertical and arms 12 and 14 are horizontal. The inclined surfaces 15 and 16 of arm 11 are metallized to form reflecting surfaces and the apex of the inclined surfaces 15 and 16 is flattened, optically polished, and clear so that it will transmit light therethrough. The flattened apex of sides 15 and 16 is designated 17. Arm 12 of multiple reflector 10 has two inclined surfaces 18 and 19 which are metallized to form reflecting surfaces. The apex of surfaces 18 and 19 is flattened, optically polished, and clear to form a slit designated 20 which will transmit light therethrough. Arm 13 of multiple reflector 10 has two inclined surfaces 21 and 22 which are metallized to form reflecting surfaces. The apex of surfaces 21 and 22 is flattened, optically polished, and clear to form a slit designated 23 capable of transmitting light therethrough. Arm 14 of multiple reflector 10 has two inclined surfaces 24 and 25 which are metallized to form reflecting surfaces. The apex of surfaces 24 and 25 is flattened, optically polished, and clear to form a slit designated 26 capable of transmitting light therethrough. Slits 17, 20, 23 and 26 are joined to form a cross-shaped slit which lies in the focal plane of the objective lens 30. Objective lens 30 is mounted, by means not shown, parallel to the arms of the multiple reflector 10. A light detector 31 is mounted in optical alignment with objective lens 30 and the multiple reflector 10 is mounted therebetween. Any light entering objective lens 30 and passing through any of the slits 17, 20, 23 or 26 in multiple reflector 10 is focused by a condenser lens 32 onto light detector 31.

A plurality of light sources are mounted about the multiple reflector and in the same plane as the multiple reflector. These light sources produce beams of light which are reflected from the multiple reflector 10 through the objective lens 30 to the reflecting pyramid 44 as will be explained more fully later. In the present embodiment four light sources 35, 36, 37 and 38 are utilized but it should be understood that more or less might be used. Light source 35 produces a beam of light which is focused by means of a condenser lens 40 onto the reflecting surface 18 of the arm 12 of multiple reflector 10. The beam of light from light source 35 is focused onto the portion of reflecting surface 18 nearest the slit 20. Light source 36 produces a beam of light which is focused by a condensing lens 41 onto the portion of the reflecting surface 15 of arm 11 of the multiple reflector 10 nearest the slit 17. Light source 37 produces a beam of light which is focused by a condenser lens 42 onto the portion of the surface 25 of arm 14 of the multiple reflector 10 nearest the slit 26. Light source 38 produces a beam of light which is focused by a condenser lens 43 onto the portion of the reflecting surface 22 of arm 13 of multiple reflector 10 nearest the slit 23. The beams of light from light sources 35, 36, 37 and 38 are all reflecting from the multiple reflector outward through the objective lens 30 to the reflecting pyramid 44.

The reflecting pyramid 44 is constructed of optical glass or other transparent optical material in this preferred embodiment, however it may be assembled from separate front-metallized mirrors. The base is a square which is directed toward the three-axis autocollimator. The four triangular sides 45, 46, 47 and 48 are arranged such that opposite sides are 90° to each other. The beams of light leaving the objective lens 30 of the three-axis autocollimator strike the base of pyramid 44 and are internally reflected twice from two of the sides of the pyramid back into the objective lens 30 of the three-axis autocollimator. The pyramid 44 is mounted so that the base is approximately parallel with the base of the multiple reflector 10 and the sides of the pyramid are approximately parallel with the sides of the multiple reflectors when the system to be aligned (or the reflecting pyramid 44) is aligned in all three axes.

Thus, a beam of light reflecting from reflecting surface 15 will be transmitted through objective lens 30 to the side 45 of pyramid 44. It should be noted that objective lens 30 inverts the image each time it passes therethrough. This has been omitted for simplicity in explanation. The beam will be reflected internally from the side 45 to the side 47 of pyramid 44. The beam will be reflected internally from side 47 through the base, through objective lens 30, to reflecting surface 21 of multiple reflector 10. A beam of light reflecting from surface 18 will be transmitted through objective lens 30 to the side 46 of pyramid 44 where it will be reflected internally to the side 48 of prism 44. The beam will be internally reflected a second time, from side 48 back through the objective lens 30 and to side 24 of multiple reflector 10. The light returning from the pyramid 44 enters one of these slits 17, 20, 23 or 26 (slit 26 in the above example) if the pyramid 44 and, hence, the system to be aligned is not properly aligned. The light transmitted through the slit or slits of the multiple reflector 10 is focused by the condenser lens 32 onto the detector 31. A single detector is utilized by time sharing the light sources 35, 36, 37 and 38. That is, each light source has a specified time during which it is on and, if light strikes the detector 31 during that time, the axis about which the pyramid 44 is misaligned can be determined. This will be explained more fully with the electronic system at a later time.

In FIGURE 1 three coordinates X, Y and Z are shown with X being the horizontal axis parallel to the plane of the multiple reflector 10, Y being the horizontal axis perpendicular to the multiple reflector 10 and the X axis, and Z being the vertical axis mutually perpendicular to both X and Y axes. The angle $\alpha$ indicates rotation about the X axis with the positive direction being in the direction of the arrow, or clockwise viewing the pyramid 44 from the right hand side of FIGURE 1. The angle $\beta$ indicates rotation about the Y axis with the positive direction being in the direction of the arrow, or clockwise viewing the pyramid 44 from the apex. The angle $\gamma$ indicates rotation about the Z axis with the positive direction being in the direction of the arrow, or clockwise viewing the pyramid from the top of FIGURE 1.

Figure 2:
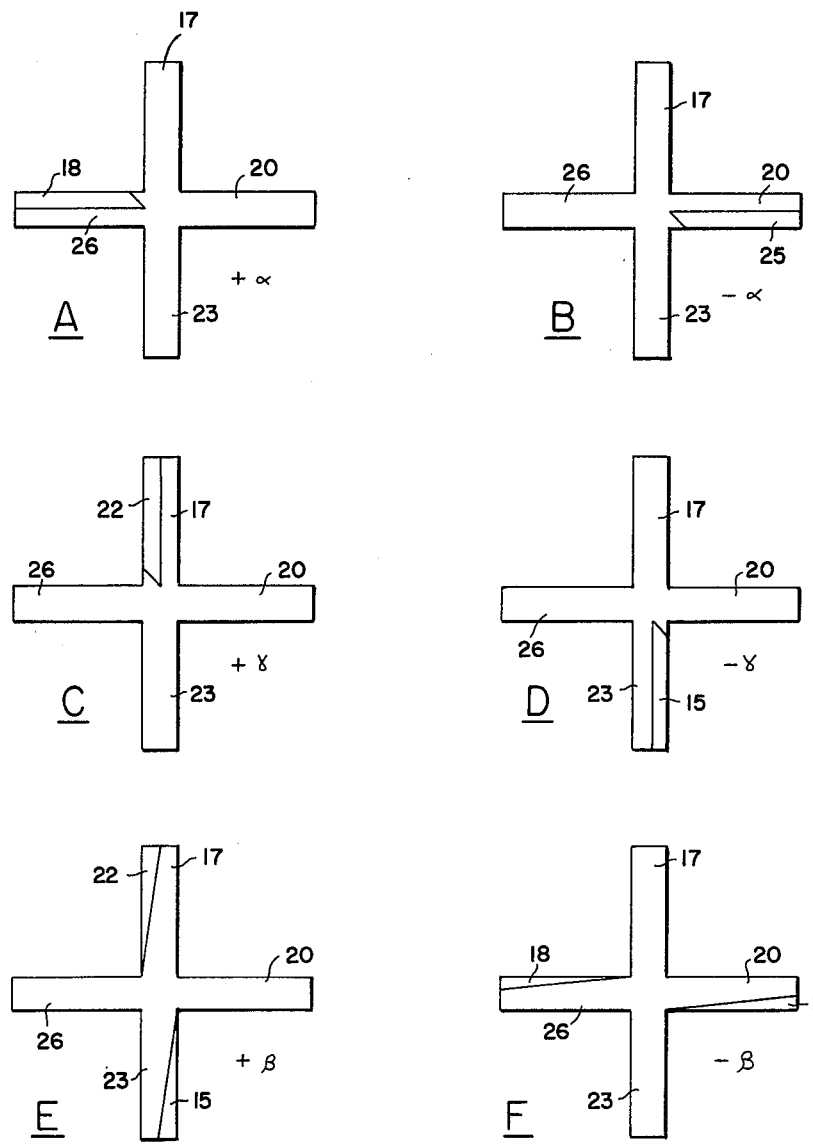
FIGURE 2 is a series of drawings of the optical slit showing the various misalignments.

FIGURE 2 consists of six different possible misalignment cases. All six of the views of the slit in the multiple reflector 10 in FIGURE 2 are enlarged to more clearly show the light which enters the slit during misalignment of the pyramid 44 around the different axes. FIGURE 2A illustrates the light which enters slit 26 during a small $+\alpha$ misalignment. The edge or illuminated portion of side 18 is mirror imaged on slit 26. As can be seen more clearly in FIGURE 1, light source 35 produces a beam of light which is focused by condenser lens 40 onto the reflecting surface 18 of the multiple reflector 10. Reflecting surface 18 reflects the beam of light through the objective lens 30 to the pyramid 44. The beam of light enters the base of pyramid 44 and is reflected internally from side 46 to side 48 and back through the base of pyramid 44 to the objective lens 30. If the pyramid 44 is rotated slightly about the X axis in a $+\alpha$ direction, the beam of light entering the three-axis autocollimator through objective lens 30 will be focused upon the slit 26, as illustrated in FIGURE 2A, rather than on the reflecting surface 24. The mirror image of reflecting surface 18 will enter slit 26 as light and be focused by condenser lens 32 onto light detector 31.

In FIGURE 2B a rotation of pyramid 44 about the X axis in a $-\alpha$ direction is illustrated. Looking at FIGURE 1, light source 37 produces a beam of light which is focused by condenser lens 42 onto the edge of reflecting surface 25. The beam of light is reflected from surface 25 through the objective lens 30 to the pyramid 44. The beam of light passes through the base of pyramid 44 and is reflected internally from side 48, side 46 and back through the base to the objective lens 30. Since pyramid 44 is rotated slightly about the X axis in the $-\alpha$ direction, a portion of reflecting surface 25 is mirror imaged upon slit 20 as illustrated in FIGURE 2B. This mirror image of reflecting surface 25 enters slit 20 and is focused by condenser lens 32 onto the detector 31.

In FIGURE 2C a rotation of pyramid 44 about the Z axis in a $+\gamma$ direction is illustrated. Light source 38 produces a beam of light which is focused by condenser lens 43 onto reflecting surface 22 of the multiple reflector 10. The beam of light is reflected from surface 22 through the objective lens 30 to pyramid 44. The beam of light enters the base of pyramid 44 and is reflected internally from side 47 to side 45 and back to the base. Since the pyramid 44 is rotated slightly about the Z axis in the $+\gamma$ direction, the beam of light leaving the pyramid is focused by the objective lens 30 onto slit 17 as illustrated in FIGURE 2C. The mirror image of reflecting surface 22 focused upon slit 17 enters the slit and is focused by condenser lens 32 onto detector 31.

In FIGURE 2D a rotation of pyramid 44 about the Z axis in a $-\gamma$ direction is illustrated. Light source 36 produces a beam of light which is focused by condenser lens 41 onto reflecting surface 15 of multiple reflector 10. The beam of light is reflected from surface 15 through objective lens 30 to pyramid 44. The beam of light enters the base of pyramid 44 and is reflected internally from side 45 to side 47 and back through the base of the pyramid 44. Since the pyramid is rotated slightly about the Z axis in the $-\gamma$ direction the returning beam of light is focused by objective lens 30 onto slit 23 as illustrated in FIGURE 2D. The mirror image of reflecting surface 15 enters slit 23 and is focused by condenser lens 32 onto detector 31.

FIGURE 2E illustrates a rotation of pyramid 44 about the Y axis in a $+\beta$ direction. To indicate rotation about the Y axis of pyramid 44 two of the light sources must be utilized. Looking at FIGURE 2E it can be seen that a portion of reflecting surface 22 is mirror imaged upon slit 17 and a portion of reflecting surface 15 is mirror imaged upon slit 23. A beam of light from light source 38 and a beam of light from light source 36 are reflected in the manner already described and portions of the mirror image of sides 22 and 15 enter slits 17 and 23, respectively, and are focused upon detector 31 by condenser lens 32.

In FIGURE 2F rotation of pyramid 44 about the Y axis in a $-\beta$ direction is illustrated. In FIGURE 2F a portion of the mirror image of reflecting surface 18 is shown focused upon slit 26 and a portion of the mirror image of reflecting surface 25 is shown focused upon the slit 20. A beam of light produced by the light source 35 is reflected in the manner already explained to provide the mirror image of reflecting surface 18. A beam of light produced by light source 37 is reflected in the manner already explained to provide the mirror image of reflecting surface 25. The mirror images of reflecting surfaces 18 and 25 pass through slits 26 and 30 respectively, and are focused by lens 32 onto light detector 31.

Figure 3:
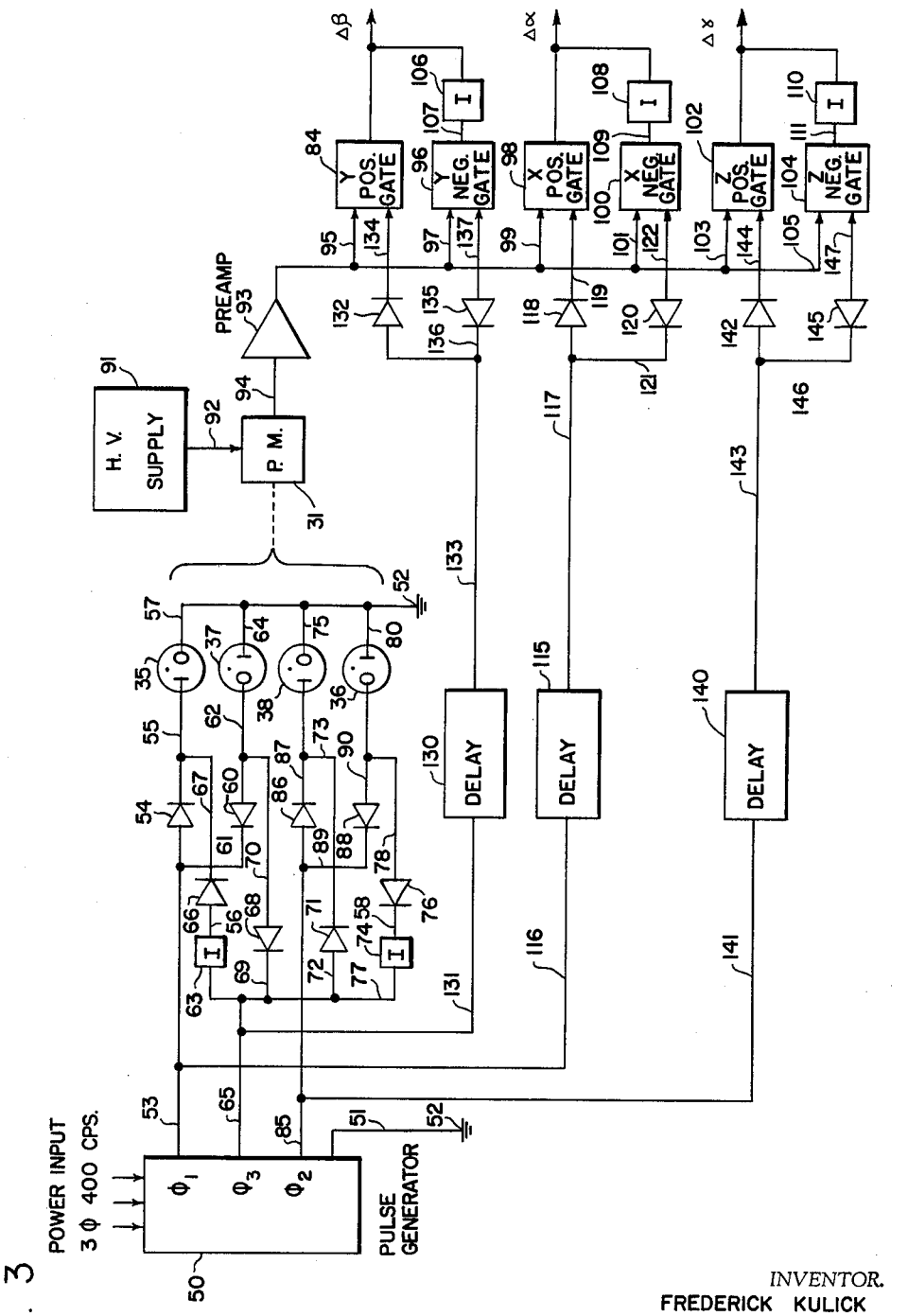
FIGURE 3 is a block diagram of the electronic system.

Various mechanisms could be utilized to determine which of the plurality of slits is transmitting light. In this preferred embodiment, a single detector and a plurality of time shared light sources are utilized to determine about which axis or axes the pyramid 44, and, thus, the system to be aligned is misaligned. In FIGURE 3 a three-phase pulse generator 50 is shown in block form having a three-phase 400 cycle per second input thereto. A line 51 connects the pulse generator 50 to ground 52. A lead 53 connects the first phase $\phi_1$ of the output of pulse generator 50 to one side of a diode 54. The other side of the diode 54 is connected by a lead 55 to the anode of a gas discharge lamp 35. The cathode of gas discharge lamp 35 is connected to ground 52 by means of a lead 57. Diode 54 is connected to conduct current from lead 53 to lead 55 when properly energized. A diode 60 is connected to lead 53 by means of a lead 61. The other side of diode 60 is connected to the cathode of a gas discharge lamp 37 by means of a lead 62. The anode of the gas discharge lamp 37 is connected to ground 52 by means of a lead 64. Diode 60 is connected to conduct current from lead 62 to lead 61 when properly energized.

The phase 3 output $\phi_3$ of the pulse generator 50 is connected by means of a lead 65 to an inverter 63. The output of inverter 63 is connected, by means of a lead 56 to one side of a diode 66. The other side of diode 66 is connected by means of a lead 67 to lead 55. Diode 66 is connected in the circuit so that it will conduct current from lead 56 to lead 67 when properly energized. One side of a diode 68 is connected to lead 65 by means of a lead 69. The other side of diode 68 is connected to lead 62 by means of a lead 70. Diode 68 is connected in the circuit so that it will conduct current from lead 70 to lead 69 when properly energized. One side of a diode 71 is connected to lead 65 by means of a lead 72. The other side of diode 71 is connected to the anode of a gas discharge lamp 38 by means of a lead 73. The cathode of gas discharge lamp 38 is connected to ground 52 by means of a lead 75. Diode 71 is connected to conduct current from lead 72 to lead 73 when properly energized. The input of an inverter 74 is connected to lead 65 by means of lead 77. A diode 76 is connected to the output of inverter 74 by means of a lead 58. The other side of diode 76 is connected to a gas discharge lamp 36 by means of a lead 78. The anode of the gas discharge lamp 36 is connected to ground 52 by means of a lead 80. Diode 76 is connected in the circuit to conduct current from lead 78 to lead 58.

The phase 2 output $\phi_2$ of the pulse generator 50 is connected to one side of a diode 86 by means of a lead 85. The other side of the diode 86 is connected to the anode of the gas discharge lamp 38 by means of a lead 87. Diode 86 is connected in the circuit to conduct current from lead 85 to lead 87 when properly energized. One side of a diode 88 is connected to lead 85 by means of a lead 89. The other side of the diode 88 is connected to the cathode of the gas discharge lamp 36 by means of a lead 90. Diode 88 is connected in the circuit to conduct current from lead 90 to lead 89 when properly energized.

Gas discharge lamps 35 through 37 are the light sources already explained in conjunction with FIGURE 1. The box 31 labeled PM is a photomultiplier tube utilized for a light detector as already explained in conjunction with FIGURE 1. A high voltage supply 91 is connected to photomultiplier tube 31 by means of a lead 92. High voltage supply 91 is utilized to energize the photomultiplier tube 31. The output of the photomultiplier tube is applied to a preamplifier 93 by means of a lead 94. The output of the preamplifier 93 is applied to the input of a gate 84 by means of a lead 95, a gate 96 by means of a lead 97, a gate 98 by means of a lead 99, a gate 100 by means of a lead 101, a gate 102 by means of a lead 103 and a gate 104 by means of a lead 105. Gate 84 is a positive Y gate and the output from gate 84 is utilized to correct a misalignment of pyramid 44 about the Y axis in a $+\beta$ direction. Gate 96 is the negative Y gate and its output is applied to an inverter 106 by means of a lead 107. The output of inverter 106 is utilized to correct for a misalignment of pyramid 44 about the Y axis in a $-\beta$ direction. Gate 98 is a positive X gate and the output is utilized to correct for a misalignment of pyramid 44 about the X axis in a $+\alpha$ direction. Gate 100 is the negative X gate and the output is applied to an inverter 108 by means of a lead 109. The output of inverter 108 is utilized to compensate for misalignment of pyramid 44 about the X axis in a $-\alpha$ direction. Gate 102 is a positive Z gate and the output of gate 102 is utilized to compensate for misalignment of pyramid 44 about the Z axis in a $+\gamma$ direction. Gate 104 is the negative Z gate and the output is applied to an inverter 110 by means of a lead 111. The output of inverter 110 is utilized to compensate for misalignment of the pyramid 44 about the Z axis in a $-\gamma$ direction.

Output $\phi_1$ of pulse generator 50 on lead 53 is applied to a delay circuit 115 by means of a lead 116. The output of the delay circuit 115 is applied to one side of a diode 118 by means of a lead 117. The other side of diode 118 is connected to the trigger input of gate 98 by means of a lead 119. Diode 118 is connected in the circuit so that it will conduct current from lead 117 to lead 119. One side of a diode 120 is connected to lead 117 by means of a lead 121, the other side of diode 120 is connected to the trigger input of gate 100 by means of a lead 122. Diode 120 is connected in the circuit so that current will be conducted from lead 122 to lead 121.

The output $\phi_3$ of pulse generator 50 on lead 65 is applied to a delay circuit 130 by means of a lead 131. The output of delay circuit 130 is applied to one side of a diode 132 by means of a lead 133. The other side of the diode 132 is connected to the trigger input of gate 84 by means of a lead 134. Diode 132 is connected in the circuit to conduct current from lead 133 to lead 134. One side of a diode 135 is connected to lead 133 by means of a lead 136. The other side of diode 135 is connected to the trigger input of gate 96 by means of a lead 137. Diode 135 is connected in the circuit to conduct current from lead 137 to lead 136.

The output $\phi_2$ of pulse generator 50 on lead 85 is applied to a delay circuit 140 by means of a lead 141. The output of delay circuit 140 is applied to one side of a diode 142 by means of a lead 143. The other side of dioed 142 is connected to the trigger input of the gate 102 by means of a lead 144. Diode 142 is connected in the circuit to conduct current from lead 143 to lead 144. One side of a diode 145 is connected to lead 143 by means of a lead 146. The other side of diode 145 is connected to the trigger input of the gate 104 by means of a lead 147. Diode 145 is connected in the circuit to conduct current from lead 147 to lead 146. It should be understood that delay circuits 115, 130 and 140 are simply placed in the circuit to insure proper timing and in some instances will not be necessary.

When the output $\phi_1$ of pulse generator 50 on lead 53 is positive, because of the diode arrangement, gas discharge lamp 35 will light and at some later time, dictated by the amount of delay in delay circuit 115, a positive signal will be applied to the trigger input of gate 98. This signal will open gate 98 and hold it open as long as there is a signal present. If a misalignment should occur as shown in FIGURE 2A light will be focused on the photomultiplier tube 31 and a signal will be applied to the preamplifier 93. The amount of light and, thus, the magnitude of the signal is an indication of the amount of misalignment. The signal at the output of preamplifier 93 will pass through the open gate 98 onto the lead marked $\Delta\alpha$. This signal will be utilized to correct the $+\alpha$ misalignment about the X axis. The signal from preamplifier 93 will also be present at the input of the other gates but because none of these have a signal on the trigger inputs, the preamplifier signal will not be allowed to pass. When the output $\phi_1$ of pulse generator 50 on lead 53 is negative the gas discharge lamp 37 is energized and the gas discharge lamp 35 is deenergized. The negative portions of the $\phi_1$ output signal from the pulse generator 50 are also applied to the delay circuit 115 where they are delayed before being applied to the trigger input of the gate 100. Diodes 118 and 120 are placed in the circuit so that when a positive signal is applied to lead 117, diode 118 conducts and diode 120 is cut off and when a negative signal is applied to lead 117, diode 118 is cut off and diode 120 conducts. Thus, the negative signal from delay circuit 115 is applied to gate 100 to open the gate. If a misalignment of prism 44 about the X axis in the $-\alpha$ direction occurs as shown in FIGURE 2B, the photomultiplier 31 will produce a signal which will be amplified in the preamplifier 93 and applied to the input of the gate circuit 100. Since the gate is open, because of the negative pulse from the delay circuit 115, the signal from preamplifier 93 will pass through the gate and be applied to the inverter 108. Inverter 108 will cause a signal of opposite polarity to be applied to the lead marked $\Delta\alpha$. This signal of opposite polarity will provide compensation for the misalignment of pyramid 44 in the $-\alpha$ direction.

When the output $\phi_3$ of pulse generator 50 on lead 65 is positive, diode 71 will conduct, energizing the gas discharge lamp 38 and the inverter 74 will apply a negative signal to diode 76 causing gas discharge lamp 36 to be energized. Also a positive signal will be applied to the delay circuit 130. The output of the delay circuit 130 will be applied to diodes 132 and 135. Because of their connection in the circuit, diode 132 will conduct and diode 135 will be cut off. When diode 132 conducts, a signal is applied to gate 84 opening that gate and allowing an input signal to pass therethrough. If the pyramid 44 is misaligned about the Y axis in the $+\beta$ direction, misalignment indicated by FIGURE 2E will occur and the photomultiplier tube 31 will receive light from reflecting surfaces 15 and 22. This light will produce an electrical signal which will be applied to the preamplifier 93, the output of which will be applied to the inputs of the gate circuits. Since the positive signal from the delay circuit 130 has caused gate 84 to be opened the signal from preamplifier 93 will pass through gate 84 to the lead marked $\Delta\beta$. This signal will then be utilized to compensate for the misalignment of the pyramid 44 about the Y axis in the $+\beta$ direction. If the output $\phi_3$ signal of pulse generator 50 on lead 65 is negative, diode 68 and diode 66, by means of inverter 63, will conduct and diodes 71 and 76 will be cut off. The signal passing through diode 68 will energize gas discharge lamp 37 and the signal passing through inverter 63 and diode 66 will energize gas discharge lamp 35. The negative signal on lead 65 will also be applied to the delay circuit 130 where it will be delayed before being applied to diodes 132 and 135. The negative signal from delay circuit 130 will cause diode 132 to be cut off and diode 135 to conduct, thereby applying a signal to gate 96 which will open that gate. If the pyramid 44 is misaligned about the Y axis in the $-\beta$ direction as illustrated in FIGURE 2F, light from reflecting surfaces 18 and 25 will be focused upon the photomultiplier tube 31. The light applied to the photomultiplier tube 31 will energize that tube causing a signal to be applied to the preamplifier 93. The output from the preamplifier 93 is applied to the inputs of the gate circuits. Since the gate circuit 96 has been opened by the negative signal from the delay circuit 130, the output signal from preamplifier 93 will pass through the gate circuit 96 and be applied to the inverter 106. The output from the inverter 106 will appear on the line marked $\Delta\beta$ and be utilized to compensate for the misalignment of the pyramid 44 about the Y axis in the $-\beta$ direction.

If the output $\phi_2$ of the pulse generator 50 on lead 85 is positive diode 86 will conduct, energizing gas discharge lamp 38 and diode 88 will be cut off. The positive signal on lead 85 is also applied to the delay circuit 140 where it is delayed before being applied to diodes 142 and 145. The positive signal from delay circuit 140 will cause diode 142 to conduct and diode 145 to be cut off. The signal passing through diode 142 will open the gate circuit 102 allowing an input signal to pass therethrough. If pyramid 44 is misaligned about the Z axis in the $+\gamma$ direction as illustrated in FIGURE 2C, light reflected from reflecting surface 22 will be transmitted through slit 17 to the photomultiplier tube 31. Photomultiplier tube 31 will produce an electrical signal which will be amplified in preamplifier 93 and applied to the input of gate 102. Since gate 102 is open, the signal will pass through to lead $\Delta\gamma$ and be utilized to compensate for the misalignment of pyramid 44 about the Z axis in the $+\gamma$ direction. If the $\phi_2$ output signal from the pulse generator 50 on lead 85 is negative, diode 88 will conduct, energizing gas discharge lamp 36 and diode 86 will be cut off. The negative signal will also be applied through the delay circuit 140 to diodes 142 and 145. Since the signal is negative, diode 145 will conduct, opening the gate circuit 104 and diode 142 will be cut off. If pyramid 44 is misaligned about the Z axis in the $-\gamma$ direction as illustrated in FIGURE 2D, light reflected from reflecting surface 15 will be transmitted through slit 23 to the photomultiplier tube 31. This light will cause photomultiplier tube 31 to produce an electrical signal which will be applied to the preamplifier 93. The output of the preamplifier 93 is applied to the input of the gate circuit 104 and since the gate circuit is open, will be passed therethrough. The signal passing through gate circuit 104 is applied to the inverter circuit 110 which inverts the signal to compensate for misalignment of pyramid 44 about the Z axis in a $-\gamma$ direction.

Figure 4:
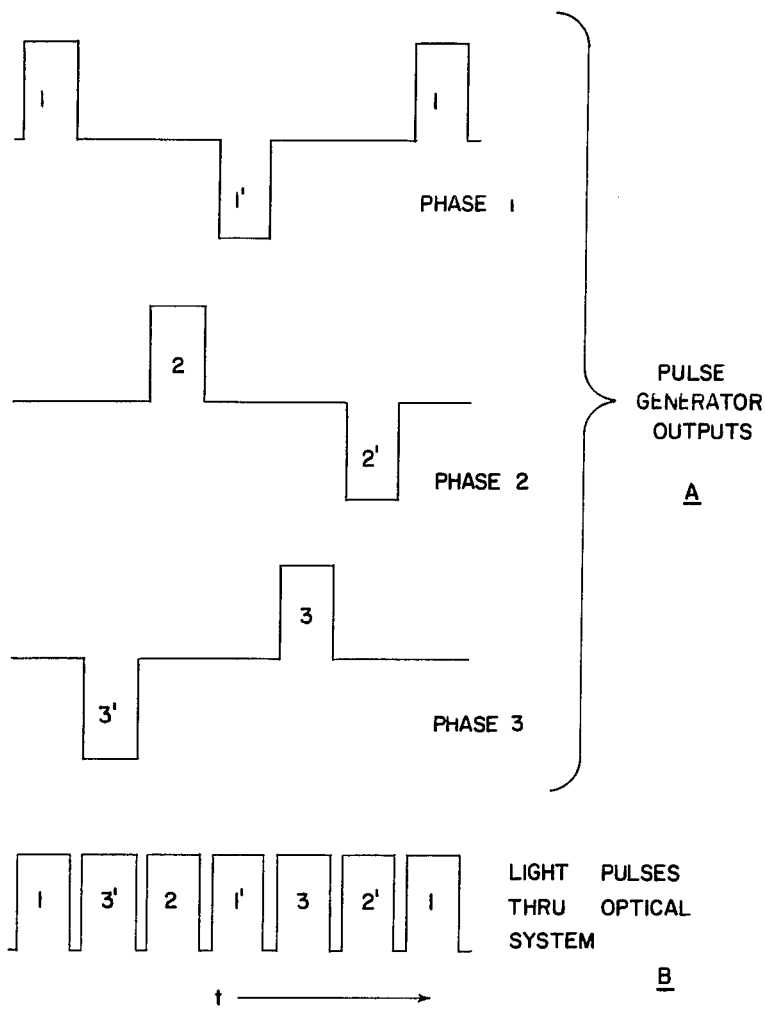
FIGURE 4 shows the phase relationship of the various pulses within the electronic circuitry.

FIGURE 4A shows the pulse generator outputs as they appear on leads 53, 85 and 65, respectively. The positive pulse on phase 1, which is numbered 1, energizes the gas discharge lamp 35, which indicates if the prism 44 is misaligned about the X axis in the +α direction. FIGURE 4B, which shows the time sequence of the pulses, indicates that the negative pulse of phase 3, which is numbered 3′, is the next pulse to occur. The negative pulse of the phase 3 output energizes gas discharge lamps 37 and 35. These lamps indicate whether or not the prism 44 is misaligned about the Y axis in a −β direction. As indicated by FIGURE 4B, a positive phase 2 pulse occurs after the negative phase 3 pulse. The positive phase 2 pulse is designated 2. The positive phase 2 pulse causes the gas discharge lamp 38 to be energized which indicates whether or not the pyramid 44 is misaligned about the Z axis in a +γ direction. A negative phase 1 pulse, which is designated 1′, is the next pulse to occur. The negative phase 1 pulse causes gas discharge lamp 37 to be energized which indicates whether or not the pyramid 44 is misaligned about the X axis in a −α direction. The next pulse to occur is a positive phase 3 pulse, which is designated 3. The positive phase 3 pulse causes gas discharge lamps 36 and 38 to be energized. The energization of lamps 36 and 38 indicate whether or not pyramid 44 is misaligned about the Y axis in a +β direction by the presence or absence of a signal on the Δγ lead. The last pulse in the series to appear is the negative phase 2 pulse, which is designated 2′. The negative phase 2 pulse causes gas discharge lamp 36 to be energized which indicates whether or not pyramid 44 is aligned about the Z axis in the −γ direction by the absence or presence of a signal on the Δγ line. It can be seen from FIGURE 4B that the next pulse to appear is a positive phase 1 pulse which begins the series of pulses again. Thus, a complete check of the alignment of pyramid 44 about all three axes in the positive and negative directions has been made. Small time increments are maintained between pulses as shown in FIGURE 4B to insure a positive identification of the axis about which misalignment occurs. It should be understood that the system will generally complete several cycles before the mechanical system, to which it is connected, by means of leads Δβ, Δα and Δγ, can be aligned, because of the mechanical system's inherently slower reaction time. This is advantageous because it will eliminate any tendency to over-compensate or oscillate in that the output pulses are averaged over several cycles by electronic means.

By mounting the pyramid 44 rigidly to a system to be aligned so that it may be viewed externally, the three-axis autocollimator consisting of the multiple reflector, plurality of light sources, detector, lens system and electronic system can be externally mounted and partially aligned with the pyramid 44. An extremely accurate fine alignment of the pyramid 44, and consequently the system to be aligned, can then be made with the three-axis autocollimator. Thus, aligning a system in three axes has been reduced to a single, simple step with the present invention.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

Apparatus for measuring the orientation of a device about three orthogonal axes, comprising:

(a) a multiple reflector comprising two right angle prisms positioned normal to each other so as to form a cross, the apex of the inclined faces of said multiple reflector being flattened, the flattened portion forming a cross;

(b) a plurality of light sources sequentially transmitting a plurality of light beams toward said multiple reflector so that said multiple reflector projects four beams of light along parallel paths toward the device to be measured:

(c) a retroreflecting pyramid fixedly mounted on the device for receiving said four beams of light and reflecting the four beams of light back along said parallel paths so as to miss the flattened portion of said multiple reflector when the device is in a predetermined orientation, a deviation of the device from the predetermined orientation about any of three orthogonal axes causing the four beams to leave the parallel paths and enter the cross shaped flattened portion in a pattern characteristic of the particular deviation; and (d) light detecting means behind said multiple reflector operable to detect light passing through the cross shaped flattened portion of said multiple reflector.

References Cited by the Examiner

UNITED STATES PATENTS

| | | | |
|---|---|---|---|
| 2,901,941 | 9/1959 | Brumley | 88—1 |
| 2,950,428 | 8/1960 | Gievers. | |
| 3,079,835 | 3/1963 | Saperstein | 88—14 |

JEWELL H. PEDERSEN, *Primary Examiner.*

SAMUEL FEINBERG, *Examiner.*

T. L. HUDSON, V. R. PENDEGRASS,
*Assistant Examiners.*